United States Patent [19]
Shockley et al.

[11] Patent Number: 5,689,417
[45] Date of Patent: Nov. 18, 1997

[54] MEDIUM-VOLTAGE CABLE EXPERT SYSTEM

[75] Inventors: Tina Renee Shockley; Eddie Lee Adams; Wayne Buford Johnson, all of Carroll County, Ga.

[73] Assignee: Southwire Company, Carrollton, Ga.

[21] Appl. No.: 446,888

[22] Filed: May 17, 1995

Related U.S. Application Data

[63] Continuation of Ser. No. 209,126, Mar. 11, 1994, abandoned.

[51] Int. Cl.⁶ .................................................. G06F 19/00
[52] U.S. Cl. ............................................... 364/401 R
[58] Field of Search .......................... 364/401 R, 488, 364/468, 468.1; 395/925, 919, 76, 77

[56] References Cited

U.S. PATENT DOCUMENTS

| | | |
|---|---|---|
| 4,713,775 | 12/1987 | Scott et al. . |
| 4,870,591 | 9/1989 | Cicciarelli et al. ............... 364/468 |
| 4,887,206 | 12/1989 | Natarajan ......................... 364/468 |
| 4,887,207 | 12/1989 | Natarajan ......................... 364/468 |
| 4,939,668 | 7/1990 | Brown et al. ...................... 364/468 |
| 5,063,506 | 11/1991 | Brockwell et al. . |
| 5,119,307 | 6/1992 | Blaha et al. ...................... 364/468 |
| 5,287,284 | 2/1994 | Sugino et al. ..................... 364/468 |

OTHER PUBLICATIONS

"Touchcom™ Interactive Videodisc Catalog Markets Furniture at Dayton's", VideoDisc and Optical Disk, vol. 5, No. 5, Sep.–Oct. 1985, pp. 343–345.

Gatty, B., "Setting Up Shop on Computer Screens", Nation's Business, Mar. 1984, pp. 57–58.

Weitel, J.R., et al., "A Company/University Joint Venture to Build a Knowledge-Based System", MIS Quarterly, Mar. 1988, pp. 23–33.

Primary Examiner—Donald E. McElheny, Jr.
Attorney, Agent, or Firm—Stanley L. Tate

[57] ABSTRACT

A rule-based expert system in combination with a plurality of catalog specification databases, a program instruction set, and a computer comprise an apparatus and provide a method for identifying and then selecting from among standard or non-standard medium-voltage power cable specifications for preparing price quotations therefor.

16 Claims, 4 Drawing Sheets

MEDIUM-VOLTAGE CABLE EXPERT SYSTEM

This is a continuation of application Ser. No. 08/209,126, filed on Mar. 11, 1994, now abandoned.

TECHNICAL FIELD

The present invention relates to a method and an apparatus for identifying and then selecting from among medium-voltage power cable specifications for preparing price quotations therefor, and more particularly to a rule-based expert system for selecting a particular cable from a multitude of standard and non-standard medium-voltage power cable specifications and then calculating cable price quotations based on the material content and manufacturing costs associated with the selected medium-voltage power cable.

BACKGROUND OF THE INVENTION

Selection of appropriate medium-voltage power cables and generating a price quotation has heretofore involved an expert cable engineer identifying a particular cable construction meeting a required specification such that the manufacturing and sales costs could be promptly and accurately quoted from volumes of data and material prices which change as often as daily. Field sales individuals were often unable to select enough data from the proper catalogs with the current information listings, so medium-voltage cable quotations have ordinarily been generated by highly specialized cable engineering professionals located at a corporate headquarters. The often daily changes of the material costs necessitated that prices quoted only days apart often had to be recalculated for identical cables.

As can be readily appreciated, the analysis of many medium-voltage of power cable materials and manufacturing parameters in preparing an appropriate power cable price quote was a time-consuming, highly-skilled, and costly labor-intensive process. Because of the great number of variables involved, many cost variables could only be estimated or infrequently updated. Orders which could not be quoted quickly enough could be subjected to recalculation when materials costs changed overnight. Sales would often be lost when the cable was urgently needed, as during an emergency, and a quote could not be prepared rapidly enough. The process was also highly prone to introduction of human error, unnecessary delay of orders, and customer dissatisfaction. Under pressure of time, price quotes would often be too high, leading to lost sales, or too low, resulting in costly losses.

In view of the foregoing limitations and other shortcomings of the prior art methods, as well as other disadvantages not specifically mentioned above, it should be apparent that there exists a need in the art to eliminate time-consuming manual identification of specific medium-voltage power cable standard and/or non-standard specifications (constructions) meeting customer requirements to eliminate hand-generated price and delivery quotations in favor of a faster, more accurate, system and method.

It is therefore a primary object of this invention to fulfill that need by providing a computer-implemented, rule-based "expert system" and method for identifying specific power cable constructions from masses of catalog and other cable specification data and materials selection, customer requirements, and cost information, for generating written quotations without delay, and for minimizing the requirement of expert cable engineer skills in the medium-voltage cable price quotation process. The present expert system incorporates a program instruction set (including at least one knowledgebase) with a computer and a multiplicity of databases. Reliance on the skills, training, and education of the cable engineer is reduced along with the cost of preparing a fast, accurate medium-voltage cable price quote.

An advantage of the present invention resides in the fact that the intellectual expertise of multiple skilled medium-voltage cable engineers is incorporated in a base of decisional rules combined in a computer-based application wherein substantially less skill in identifying the power cable is required for rapid, accurate, reliable, and economical cable quotations. Quotations are quickly generated, often saving days of delay in obtaining a corporate or regional office quotation. The latest cost data and pricing calculations required are automatically incorporated into the process of generating each quotation.

Another advantage of the present invention is that use of an expert system enables entry of more variables which affect the cost of manufacture of a medium-voltage cable, including more frequent update of materials cost, machine utilization and scheduling, and labor and other variable costs associated with manufacturing a cable at a profit.

SUMMARY OF THE INVENTION

Briefly described, the aforementioned objects are accomplished according to the invention by providing a rule-based expert system in combination with a plurality of catalog specification databases, a program instruction set, and a computer. The computer can be a dedicated small computer or a large computer. The preferred computer is a microprocessor-based personal computer. Use of smaller, powerful computers enables easy field deployment of the quotation systems, and fast, reliable database updates via modem from a central location.

The method of selecting a given cable according to customer requirements involves the steps of determining the specific customer requirements through interactive data query and response, identifying suitable catalog-based or special cable specifications and availability through selection and interrogation of databases, confirming or validating the requirements and the specifications, determining the cable outer diameter (size), calculating the costs and prices, totaling the costs, and generating the quotation, in printed form if desired.

Additional information, such as shipping reel size, production machinery selection and scheduling, may also be made available for manufacturing, cost accounting or other purposes. Variations in materials, specifications, quantities, etc., can be quickly accommodated.

The preferred expert system apparatus includes a computer including a memory unit, a control unit, an arithmetic logic unit, and an input/output unit; a rule-based program instruction set; a data storage unit including stored data in a plurality of databases; a keyboard or other suitable equipment for entering data relating to customer requirements, costs, and sales information; at least one communications pathway for exchanging data between the computer and the data storage unit; and one or more devices for outputting the quotation in human cognizable form. In this system, the program instruction set is adapted for directing the inquiries and responses to identify and select a specific medium-voltage cable construction suitable to the use, and to effectively identify the cable materials and all material, manufacturing, and shipping preparation costs associated therewith. The program instruction set is then used to direct necessary calculating and computer input/output operations to generate a printed quotation.

DESCRIPTION OF THE DRAWINGS

With the foregoing and other objects, advantages, and features of the invention which will become hereinafter apparent, the nature of the invention may be more clearly understood by reference to the following detailed description of the invention, the appended claims, and to the several views illustrated in the attached drawings.

DETAILED DESCRIPTION OF THE PREFERRED EMBODIMENT

Figure 1:
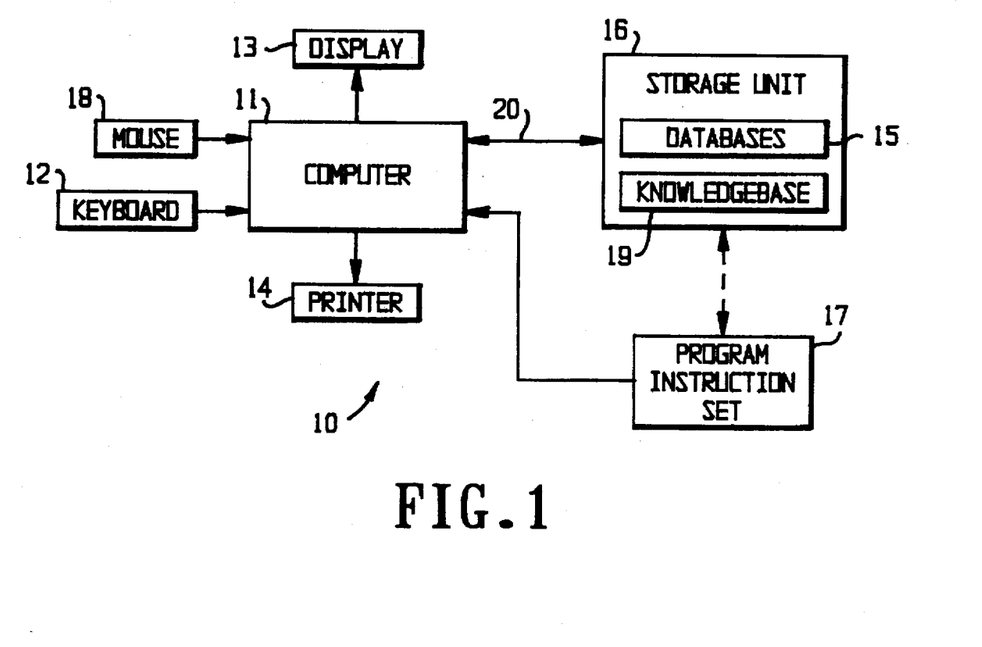
FIG. 1 is a simplified block diagram of the medium-voltage cable expert quotation preparation system according to the present invention.

Referring now to FIG. 1, a preferred embodiment of the medium-voltage cable quotation system is shown, including a computer 11 adapted to receive input from a keyboard 12, output to a display unit 13, and/or a to printer 14 for output of data in human cognizable form. The computer 11, communicates with one or more databases 15 in a storage unit 16 for exchange of data.

Figure 2:
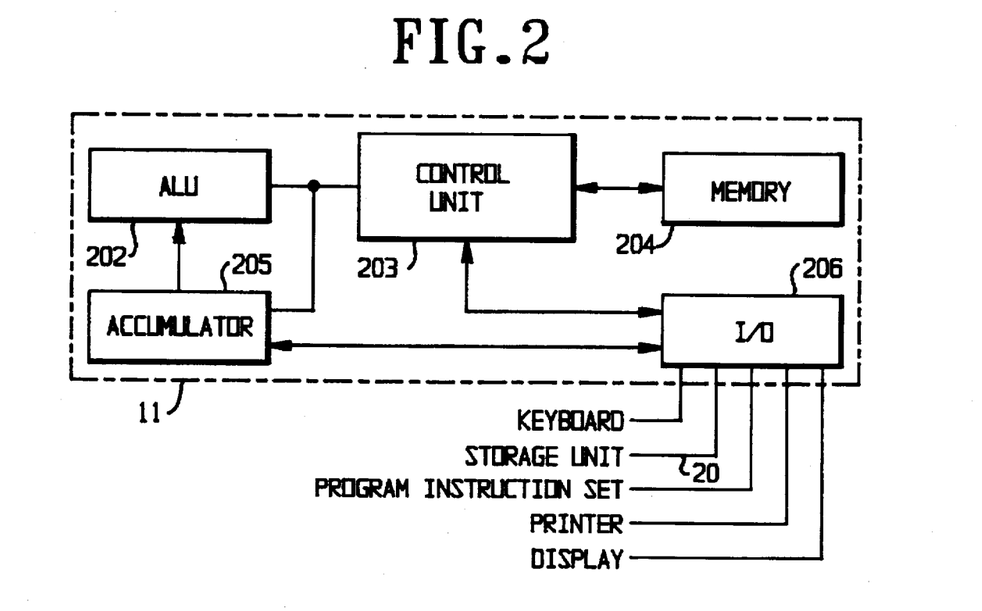
FIG. 2 is a simplified diagram of the computer shown in FIG. 1.

Shown in FIG. 2, the computer 11 is of conventional design; it can be, for example, a microprocessor, which includes an Arithmetic Logic Unit ("ALU") 202, a control unit 203 communicating with the ALU 202 and with an input/output ("I/O") function unit 206. ALU 202 performs logical operations such as AND, OR, etc., and arithmetic operations such as addition, subtraction, multiplication, and division. A memory unit 204 communicates with control unit 203 for temporary storage. The control unit 203 directs operation of the computer from the memory 204 instructions and executes these instructions. An accumulator 205 communicating with the ALU 202, control unit 203, and I/O unit 206 is often included for additional temporary storage of data. The I/O unit 206 handles the input and output operations, sending and receiving signals to and from the microprocessor 201.

Computer 11 (FIGS. 1 and 2) interactively operates under control of a program instruction set 17, all or part of which may be retained in storage unit 16 or in the computer internal memory unit 204 during operation. These elements may be configured as a personal computer for convenience.

The display 13 is a video monitor; in combination with the keyboard 12, they form a preferred man-machine input-output interactive device.

An illustration of the computer, including such a microprocessor 201, is shown in FIG. 2. Known expert systems are computer program instruction sets using inferential reasoning processes in conjunction with bases of factual knowledge in order to solve problems and make decisions normally requiring a human expert. These expert systems provide users with a simple interactive mechanism for obtaining in a rapid and orderly manner expert advice and decision-making capabilities in a specific field. Expert systems are daily being relied upon for accurate, informed decision making based on somewhat uncertain or "fuzzy" information and offering the judgement of human experts.

The expert system of the present invention consists of an inference engine (the part of the system that performs the reasoning processes) and a user interface (the part of the system the user interacts with) to receive advice.

The knowledgebase rules herein consist of a condition that, if verified, will result in a certain consequence or conclusion. Rules are written in the form of IF . . . THEN statements, e.g., IF it is raining THEN don't go to the beach. All of the rules of a knowledgebase are related or interconnected by the goals and sub-goals of the system. The goals are the ultimate conclusions that the system can achieve.

Operation of the expert system according to the example of the present invention includes an interactive dialogue between the user and the inference engine. The user provides situation dependent information to the inference engine via the keyboard 12 and the inference engine evaluates that information in reference to the knowledge contained in the rules of the knowledgebase 19. Ultimately, the inference engine will either reach a final goal of the knowledgebase 19 according to the program instruction set 17 or will determine that insufficient information is available from either the user or the knowledgebase to proceed any further.

A backwards chaining inference process is used to achieve the expert system objectives. Starting with the first goal of the knowledgebase, the inference engine will seek rules that conclude the goal (THEN statements) and next test if the supporting conditions of the rule (IF statements) can be met. When an IF statement is not known, the inference engine interrogates the user for the required information via the video monitor display 13 and keyboard 12 in order to continue to reach the final goal.

The knowledgebases 19 are collections of factual information and rules relating these facts containing the expertise of a system. Knowledgebases used herein are executed as a series of condition-action rules in a simple language called Production Rule Language (PRL). The expert system uses compiled knowledgebases output from the development system. For simplicity, an expert system "shell" such as "Level 5" from Information Builders, Inc. is preferred for many of the expert system tasks required in this system. The person having ordinary skill in the computer programming arts familiar with the Production Rule Language can, without undue experimentation, prepare the program instruction set from FIGS. 1-3 and 4A-4C, and the following description.

A number of inquiries are used to obtain needed information from the user, including numeric inquiries, attribute/value inquiries, and string inquiries.

A numeric query is a request for a numeric value in response to a video monitor display screen 13 inquiry. The value entered via the keyboard 12 may be compared by the inference engine to values contained in the rules, used for mathematical calculations, entered into databases 15 or passed to other programs.

Attribute/value queries request selection, from a displayed list of choices, the item or "value" that best describes the stated condition or "attribute." The display cursor may be positioned to the desired choice using the arrow keys or the spacebar, and then the Enter key on the keyboard is pressed. The <PAGE> or other selected key may be used (if available) to view all available choices before responding.

If the item selected highlights (e.g., changes to reverse video or the equivalent) after pressing the Enter key and a response <DONE> is displayed, the user may choose more than one value in answer to the query. In this case, the attribute is denominated as "multivalued" by the system.

After each value is selected it will appear highlighted (e.g., by reverse video). If an answer is to be changed, the Enter key is pressed again with the cursor pointing to the highlighted item to be de-selected. When finished making choices, the user presses the <DONE> or other selected key to enter the answer and continue.

String queries request provision of string or character information. Responses to string queries can use any letter or number and can be as long as the highlighted area displayed under the question. The answer is entered via keyboard 12 and the Enter key is pressed. The backspace key is used to correct any errors before the Enter key is pressed.

Goal selection is accomplished on a displayed menu of possible conclusions or goals that can be achieved during the knowledgebase session. If a particular item is of special interest to the user, the list of possible conclusions can be narrowed by selecting a goal from the menu. The cursor is positioned to the desired choice and the Enter key is pressed.

Less important knowledge or answer goals, or sub-goals, can be sought with the expert system. If there are further sub-goals beneath the selected goal, the user can continue to narrow the possible conclusions by selecting such a sub-goal. If a goal is selected for which there are no further sub-goals, the expert system is set to a final conclusion of the knowledgebase. In such case, a conclusion or end of session notice is displayed, and the user must return to the main search quest.

Figure 3:
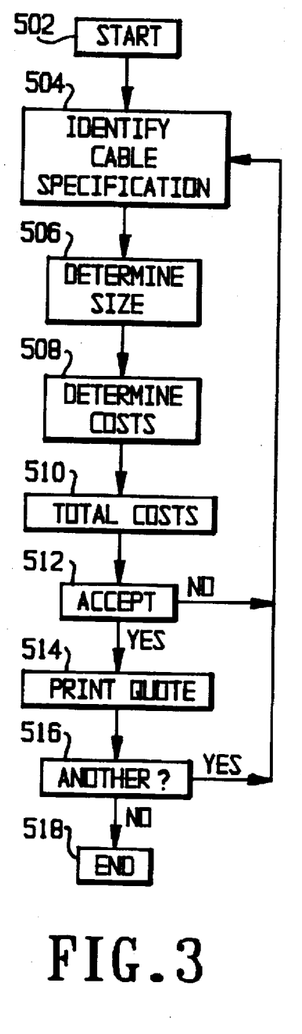
FIG. 3 is a simplified procedural outline of the present method for preparing medium-voltage cable quotations.

There is shown in FIG. 3 a simplified block diagram of the process steps accomplished with the expert system in the present invention 10 under control of the program instruction set 17 by the user, including the steps of beginning the procedure at START step 502, selecting a given cable according to customer requirements by identifying a given standard or non-standard cable specification, or identifying a cable construction which meets specific customer requirements through data query at step 504, determining cable size and related information at step 506, determining the cable material costs, manufacturing costs and shipping (reel) preparation costs at step 508, then totalling the costs in step 510, accepting or rejecting the cable costs at 512, printing a quotation in the desired number of copies at step 514, and performing another cable quote or ending the procedure, step 516. If a cable quote is not accepted, the user may direct the program instruction set to return to the cable specification identifying step 504. When no further quotations are to be generated, the procedure may be stopped at END 518.

Figure 4A:
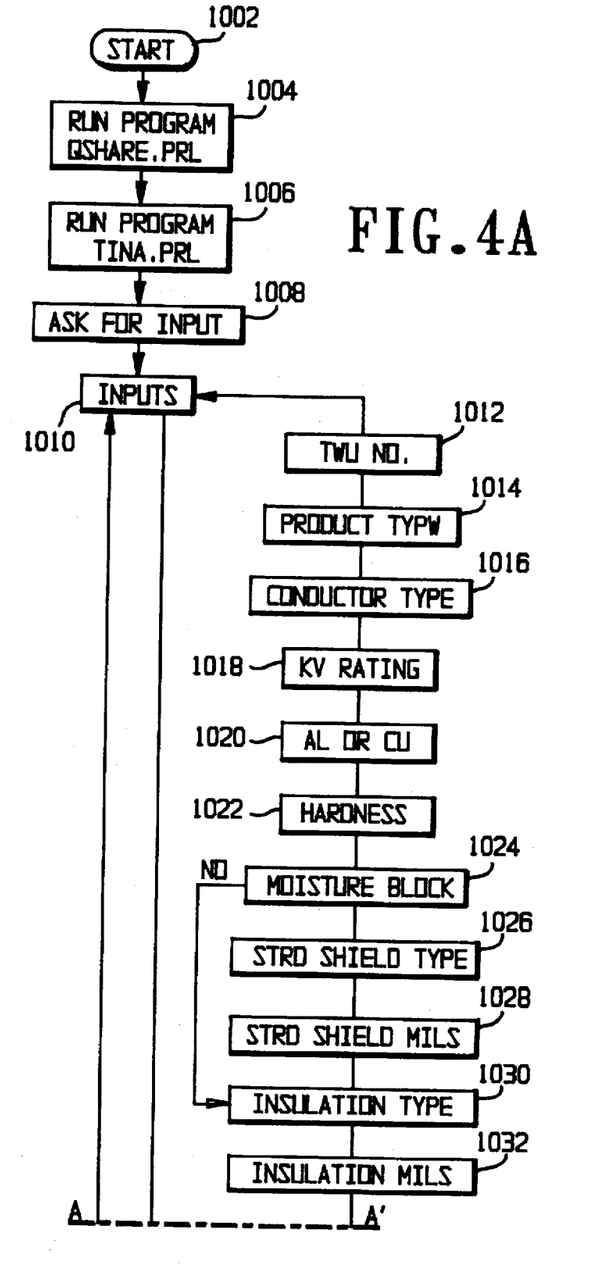
FIGS. 4A, 4B and 4C comprise a detailed flow diagram of the medium-voltage cable expert quotation system.
Figure 4B:
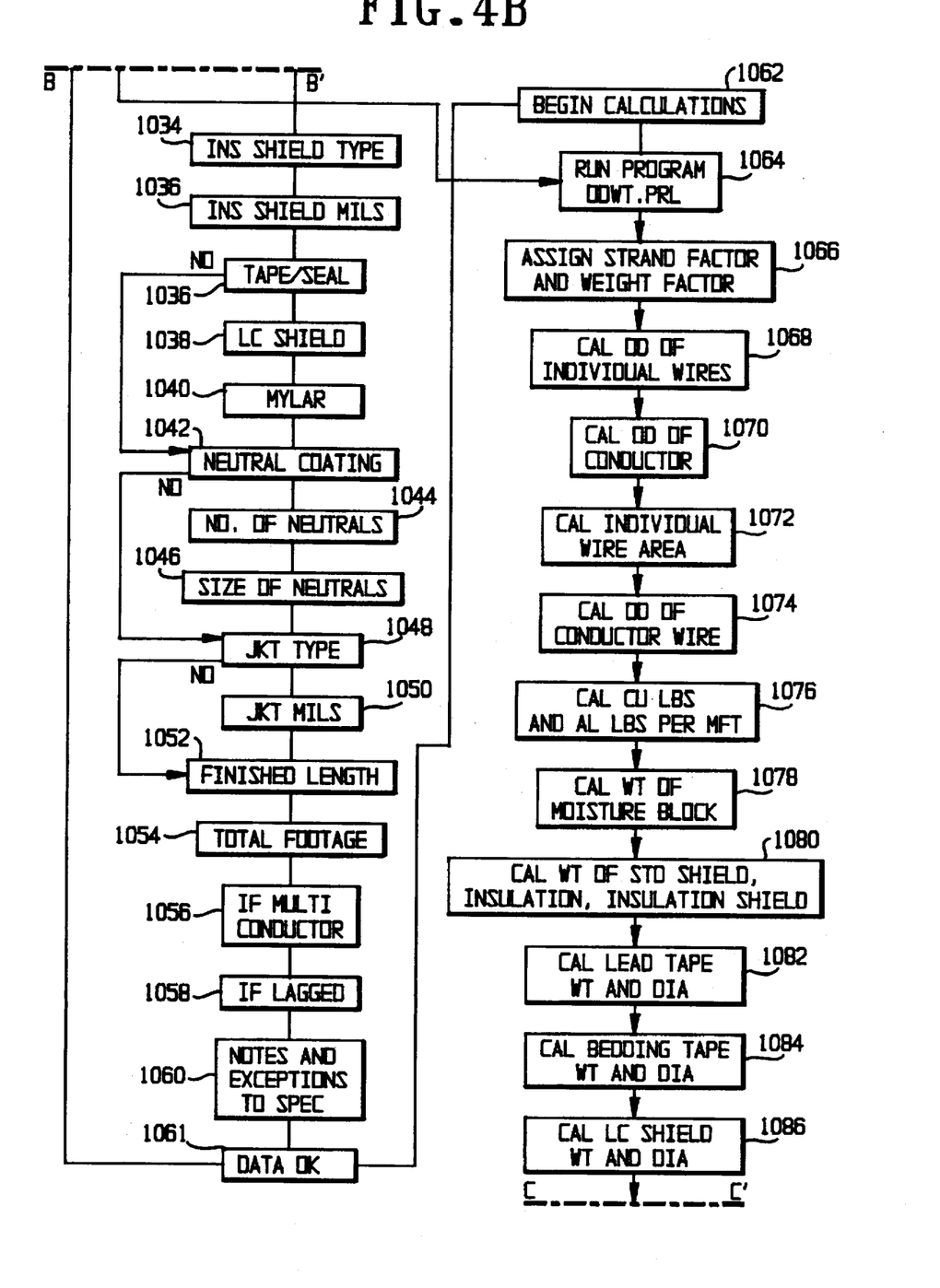
Figure 4C:
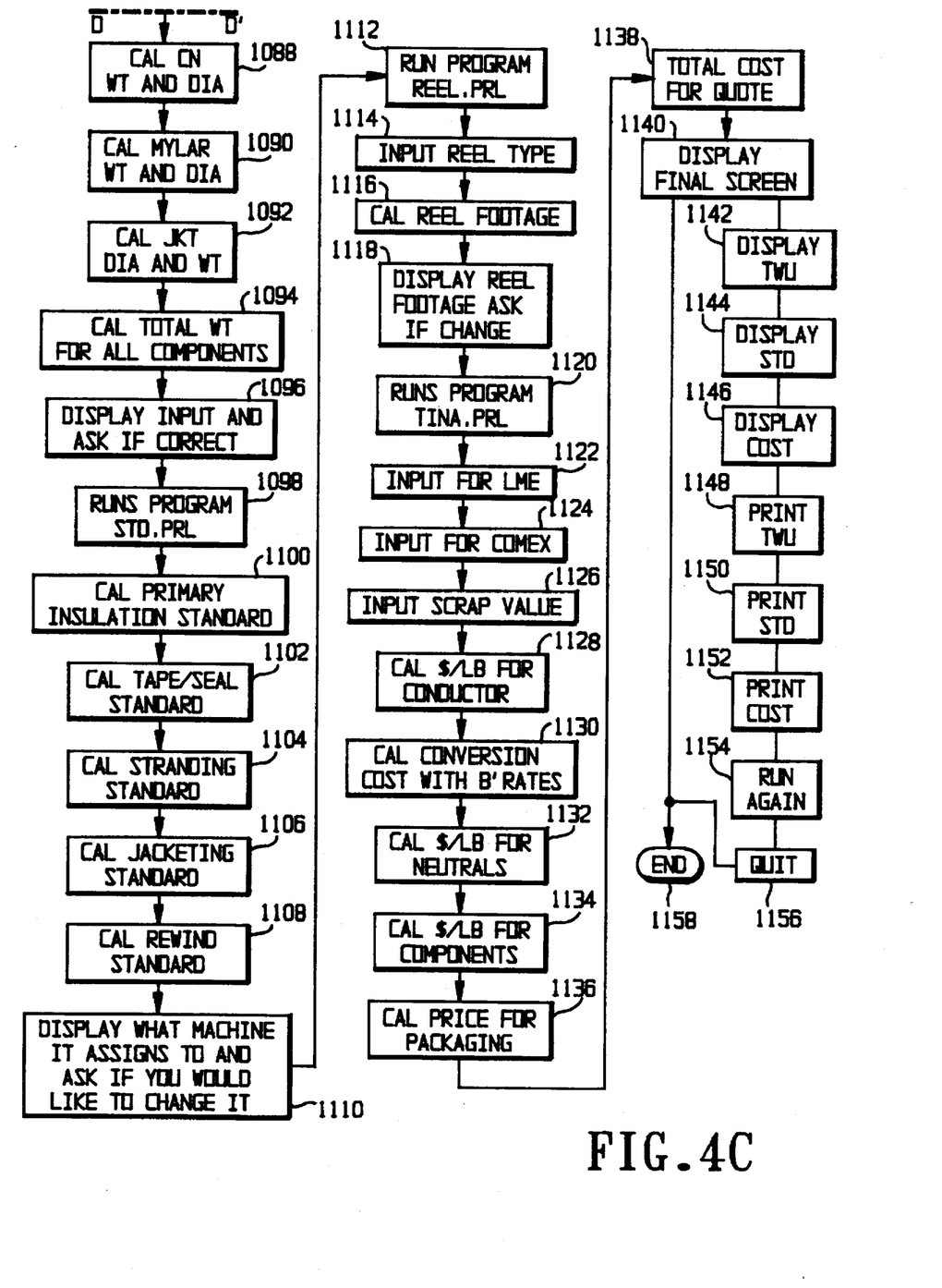

The method of the invention is shown more clearly in FIGS. 4A, 4B, and 4C an illustrative block diagram of the invention in flow terms, in connection with the apparatus illustrated in FIGS. 1 and 2.

From START block 1002, the program instruction set initializes the expert quoting system to its beginning values. Once the initialization process is completed according to the START block functions, the routine QSHARE (QSHARE.PRL, a condition-action rule set) is begun at block 1004. QSHARE is a major part of the expert system program instruction set. A function of QSHARE is to call up necessary subroutines and open the relevant databases 15 in storage unit 16. Another PRL subroutine (here called TINA.PRL, another condition-action rule set) is called up at block 1006.

The program instruction set 17 then proceeds to ask for a first in a series of user response inputs at block 1008. The expert system program instruction set uses a series of inquiries to obtain needed information from the user, including numeric inquiries, attribute/value inquiries, and string inquiries. Among the inputs required are the full cable specification. That is, details of the cable construction and performance characteristics are required in order to identify the product type according to a multiplicity of standard and non-standard cable configurations related to standards and data included in the opened databases 15. Once the full cable specification for either standard or non-standard cables is determined, the costs of manufacture and materials can be calculated and delivery information determined.

If the cable construction specification is not fully known, or if it requires verification, INPUT block 1010 verifies the cable specification if known and the program instruction set 17 proceeds to the outside diameter and weight subroutine ODWT 1064 (ODWT.PRL, another condition-action rule set). The procedure followed is to interrogate the user and apply a rule from the knowledgebase 19 to the response. This rule could be called "to know product name" and can be stated as 'IF the (cable) idname includes "[name]", THEN the product name is known'and can be identified with reference to the databases 15. An example of product identification is illustrated by the following subroutine:

RULE XX TO KNOW PRODUCT
IF PRODUCT IS 2|0
THEN KNOW PRODUCT
AND PRODUCT STRING :="2|0"
AND KCMILS :=133.079
AND STRANDS :=1

Of course, a multiplicity of product names and specifications must be stored in the database(s) 15, generally corresponding to the number of standard cable types and standards and non-standard cable types for which adequate information is known and has been stored in the databases 15.

If the cable identification is not known, program instruction set control proceeds to block 1012 and a series of user inputs are requested to determine the correct cable specification. The first of the interrogations asks for TWU NO. information in block 1012. In PRODUCT TYPW block 1014, certain product type information input is requested, such as how the cable strands are formed into the conductor (s), e.g., compacted strand. Conductor type information is determined in block 1016.

The cable voltage rating must be determined; this is accomplished in block 1018. The procedure is to interrogate the user and apply a rule from knowledgebase 19 to the response. For the purpose of this exemplary embodiment, this rule could be called simply "kilovolts" or a similar name and takes the form of the following subroutine:

RULE XX TO KNOW KV
IF KV IS 25
THEN KNOW KV
AND KV :=25

Of course, a non-standard cable specification can be determined by restating the "kilovolts" rule as follows:

RULE XX TO KNOW KV
IF KV IS DIFFERENT, INPUT KV RATING
AND KV <>0
AND KVNUM :=KM

Similar techniques are applied to determine the conductor material in AL or CU block 1020. Another material can be identified if alloys (such as aluminum alloys, etc.) are included in the database 15.

It may be desirable to limit the selection of subsequent databases or database entries for a subsequent step, in order to speed the process. For example, where choice is to be made between two values, and where one value is chosen substantially more often, or leads to a substantially faster search, such a choice can be placed ahead of the later search in the menu of choices to improve performance. The cable conductor hardness specification for aluminum and copper cables is one example of such performance improvements.

The cable hardness, or annealing specification is an important medium-voltage cable specification parameter to be determined, accomplished in HARDNESS block 1022. Whether or not a moisture block material layer is required is determined in block 1024. When no moisture block is required, certain cable specification parameter information requests related to such can be avoided; thus a negative response leads to block 1030, while an affirmative response leads to STRD SHIELD TYPE block 1026, where the type of strand shield is determined by interactive user input. If a strand shield is selected in MOISTURE BLOCK block 1024 the strand shield size information is required and then is identified in STRD SHIELD MILS block 1028. The strand shield wall thickness value is entered here.

The program instruction set 17 then continues with input of requested insulation information, following either from MOISTURE BLOCK block 1024 or STRAND SHIELD MILS block 1030. First, the INSULATION TYPE block 1030 requests the specified information, then the insulation size, type of insulation shield, and insulation shield size are determined in the INSULATION MILS, INSULATION SHIELD TYPE, and INSULATION SHIELD MILS blocks 1032, 1034, and 1046, respectively. At each of these steps, the program instruction set can refer to databases 15 for comparison and verification of specification or material data.

Medium-voltage cables may be either taped and sealed or not, according to the required use specifications. It is generally less expensive per unit of length to avoid such a tape/seal and so such may be omitted when specifications permit. Blocks 1036, 1038, and 1040 request user input to determine if the required cable is to have a tape/seal and details thereof. If not, the program instruction set advances to the neutral coating input series at block 1042, and if an affirmative response is input in TAPE/SEAL block 1036, then data is gathered in LC SHIELD (longitudinal corrugated shield) block 1038, and the alternative use of mylar film is determined at MYLAR block 1040.

Proceeding from either TAPE/SEAL block 1036 or MYLAR block 1040, the program instruction set must determine if any neutral wire covering is required, and if so, the number and size thereof. This information is determined according to the program instruction set 17 by inquiry at NEUTRAL COATING block 1042. A negative user response is directed to JACKET TYPE block 1048, while an affirmative response is followed by additional jacket inquires: NO. OF NEUTRALS block 1044 and SIZE OF NEUTRALS block 1046. Reference may be made to databases 15 if desired.

The required medium-voltage cable may or may not require a jacket. When such is not the case as determined by inquiry at JACKET TYPE block 1048, the program instruction set 17 advances inquiry to FINISHED LENGTH block 1052; when such is not the case as determined by an affirmative response at JACKET TYPE block 1048, the program instruction set advances inquiry to JACKET MILS block 1050 to inquire as to the desired jacket size before proceeding to FINISHED LENGTH block 1052.

Next, certain basic data regarding the finished medium-voltage cable is gathered, including the TOTAL FOOTAGE in block 1054, whether or not the cable is a multiconductor cable in IF MULTICONDUCTOR block 1056, whether the reel on which the cable is to be provided is to be lagged in IF LAGGED block 1058, and NOTES AND EXCEPTIONS TO SPEC block 1060 is used to note the identified variations. All normal basic information and standards regarding the desired medium-voltage cable is complete after block 1060 is completed. However, the information gathered may be incomplete, inaccurate, or not relate to current manufacturing capabilities, or some other problem which would necessitate modifying the input information. Thus, DATA OK? block 1061 may be provided at this step in the procedure to verify and accept the cable specification data, or to enable changing the cable specification data before BEGIN CALCULATIONS step at block 1062.

At this point in the program instruction set procedure, the expert system has identified with particularity the desired cable, the length of the cable, and the individual component variables which determine the cable characteristics and cost per unit length. The program instruction set hereafter changes from a largely interactive information gathering and medium-voltage cable construction specification determining mode to a series of information processing steps to transform the input data and standard or other cable specification information into a price quotation.

From INPUTS block 1010 or BEGIN CALCULATIONS block 1062, operation of the program instruction set advances to sub-routine ODWT.PRL (a condition-action rule set) at block 1064 for processing of the input cable specifications, comparison with standard cable specifications, calculation of the manufacturing and final preparation costs, and preparation of a finished medium-voltage cable quote. Additionally, specific machine production capabilities and scheduling of specific production machinery can be factored into the process at this stage in the program instruction set procedure.

The program instruction set 17 again calls up subroutine ODWT 1064. Initially, a strand factor and a weight factor are assigned to the cable in ASSIGN STRAND FACTOR AND WEIGHT FACTOR block 1066. Common strand factors may include 1, 3, 7, 11, and others, and which relate to 1, 7, 37, and 91 strand cables and to 1, 7.3, 45, and 115 weight factors, respectively. Other strand and weight factors may be used if desired; the foregoing values are merely given as examples for the purpose of illustrating this descriptive example. These data elements are retained in memory 204 or stored in storage 16 and can be referred to as needed. From block 1066, the program instruction set 17 advances through the stages of controlling and calculating the outside diameter of individual wires in the cable, calculating the outside diameter of the cable conductor, calculating the individual wire area in the cable, calculating the cable conductor wire area, calculating the weight of the conductor by metal type per unit length, and calculating the weight of the moisture block (if used) per unit length in the cable. These procedures are carried out in CAL OD OF INDIVIDUAL WIRES, CAL OD OF CONDUCTOR, CAL INDIVIDUAL WIRE AREA, CAL CONDUCTOR WIRE AREA, CAL COPPER AND ALUMINUM LBS PER UNIT LENGTH, AND CAL WEIGHT OF MOISTURE BLOCK blocks 1066, 1068, 1070, 1072, 1074, 1076, and 1078, respectively.

CAL WT OF STANDARD SHIELD, INSULATION, AND INSULATION SHIELD block 1080 represents the procedures for those respective identified process steps. Similarly, a plurality of blocks 1082, 1084, 1086, 1088, 1090, and 1092 represent the process steps identified as CAL (calculate) LEAD TAPE WT (weight) AND DIA (diameter), CAL BEDDING TAPE WT AND DIA, CAL LC SHIELD (longitudinal corrugated shield) WT AND DIA, CAL CN (concentric neutral) WT AND DIA, CAL MYLAR WT AND DIA, AND CAL JKT (jacket) DIA AND WT. In each of these steps, the weight and diameter of all the respective cable construction materials is calculated; in CAL A TOTAL WT FOR ALL COMPONENTS block 1094, the weight and diameter of all cable elements is computed together. To determine if the selected cable construction information is correct, one or more of these material characteristic values of the cable is totaled, compared, and presented in DISPLAY INPUT AND ASK IF CORRECT block 1096 to check that the calculating and totalizing process steps have been correctly performed. Reference to databases 15 may be made to aid accuracy.

DISPLAY INPUT AND ASK IF CORRECT block 1096 represents a final rule to determine that a proper answer is known. It can be represented by the following example subroutine:

RULE to know answer
IF know strd factor
AND od ind wires known
AND know od conductor
AND know ind wire area
AND know od conductor wire (area)
AND know lbs mft
AND know moisture block
AND strand shield dia known
AND strand shield wt known
AND insulation dia known
AND insulation wt known
AND insulation shield dia known
AND insulation wt known
AND know lead foil
AND know bed tape
AND know lc cal
AND know cn cal
AND know my cal
AND know jkt cal
AND know total
THEN know answer If correct, the program instruction set 17 passes control to the subroutine STD.PRL (another condition-action rule set) at block 1098 for determination of which of several extruders the cable can be made on, depending on machine characteristics, costs, and other factors.

This subroutine includes a calculation of each of: the primary insulation, the tape/seal, the stranding, the jacketing, and rewind standards, which calculation process steps occur in respective blocks 1100, 1102, 1104, 1106, and 1108. Each of these calculations requires referral to at least one independent rule in the knowledgebase 19 and to the databases 15. Each of the calculations is retained for use and another "know answer rule" is tested and the user given an opportunity to make changes and/or corrections before determining which reel the finished cable will be shipped on and the costs associated therewith.

DISPLAY WHAT EXTRUDER IS ASSIGNED AND ASK IF CHANGES block 1110 represents that this final rule is determined to be known. This step accomplishes the task of determining a correct combination of extruder, strander, and rewind machine selection. It can be represented by the following example subroutine:

RULE to know answer
IF machine ext (extruder) known
AND changeext known
AND machine strd (strander) known
AND ext database searched
AND cal ext std known
AND know tapeseal
AND strd database searched
AND strd bc (strander bobbin change) known
AND strd wire known
AND strd dia known
AND strd rt (stranding run time) known
AND cal rt known
AND jkt std known
AND rewind turc (take-up reel change) known
AND rewind porc (payoff reel change) known
AND rewind rt known
AND cal rwrt known
THEN know answer If a correct and acceptable answer is determined, the program instruction set 17 advances to the REEL 1120 subroutine REEL.PRL (yet another condition-action rule set). The steps can be repeated and databases 15 consulted, if necessary to arrive at a correct extruder, strander, and rewinder selection for the combination of manufacturing equipment required to make the cable. In the REEL subroutine, the various reels available are identified from one of database 15 and the correct size reel is selected and verified. This selection is necessary because the various reels to select from hold different lengths of cables, depending on the cable and reel diameters, and different cable reels require different cost estimates, among other reasons. Some reels require additional packaging preparation, as for a sea voyage to a remote area.

Beginning at block 1120, the reel selection steps are undertaken. At INPUT REEL TYPE block 1114, a preselected reel type is proposed by the program instruction set 17 according to the previously determined information. Next, in CAL REEL FOOTAGE block 1116, the size(s) are calculated according to the cable length, then compared for verification at DISPLAY REEL FOOTAGE AND ASK IF CHANGES block 1118. An affirmative answer returns the processing to program instruction set control under the subroutine TINA 1120.

Finally, with all of the materials quantities and manufacturing and reel/shipping preparation costs determined, according to the expert system, the values of the materials costs for a given cable order are identified, selected, calculated, and totaled for preparation and output of the medium-voltage cable quotation.

Cable materials prices vary day-to-day and even hourly. Not all material prices fluctuate as rapidly or as significantly as do others; nor are all cable material price fluctuations determinable from reference to the same sources. For example, some prices are set at the London Metals Exchange (LME) while others are set at the Commodities Exchange (COMEX). Still other materials may reflect varying prices due to recycling and recovery operations, the costs associated therewith varying regularly. Changes in these prices are to be incorporated into the materials price databases 15 with regularity; the person having ordinary skill in the art will recognize that the periods for entering this information will vary among the sources and over time as commodity price stability is unpredictable. For example, in periods of stable prices the prices may be entered weekly, bi-weekly, or perhaps monthly. Entry of such information can, for example, be accomplished with ease electronically by downloading large blocks of data overnight or during periods of low use. Those persons having ordinary skill in the art will be familiar with methods for updating database information. This process is only described in general terms since this step does not form a part of the present information. In blocks INPUT FOR LME, INPUT FOR COMEX, INPUT SCRAP VALUE, CAL (calculate) COST PER UNIT WEIGHT FOR CONDUCTOR, CAL CONVERSION COST WITH B'RATES (machine burden rates), CAL COST PER UNIT WEIGHT FOR NEUTRALS, CAL COST PER UNIT WEIGHT FOR COMPONENTS, CAL PRICE FOR PACKAGING in blocks 1122, 1124, 1126, 1128, 1130, 1132, 1134, and 1136, respectively, the cost calculations are compared.

The medium-voltage cable quote costs are totalled in block 1138, and preliminarily displayed for the user at the step indicated by block 1140 for acceptance and/or verification. Savings can be effected by elimination or substitution of components and/or materials, or increased cable performance ratings can be obtained through the use of alternate materials or construction. These decisions can be made rapidly and accurately on the basis of comparison quotes obtained by repeating the quotation procedure. If the total price is not acceptable or obviously wrong, repetition of some or all of the foregoing steps may be repeated to ensure an accurate, timely quotation at this point. A printed quotation is generated next or the process ENDed at block 1158.

Beginning from step 1140, the TWU NO. information obtained in block 1012 is retrieved from memory 204 or storage 16 and displayed as is represented by block 1142, the STD information obtained in block 1110 is retrieved from memory or from storage and displayed as is represented by block 1144, and the cost information from block 1138 is printed as is represented by block 1146. Thereafter, the TWU NO. information, the STD information, and the cost information from block 1138 is retrieved from memory or from storage and displayed as is represented by block 1152. The printed quote is produced in the desired number of multiple copies and processed according to standard corporate procedures not forming a part of the present invention; when a given cable quotation is completed, the process may be repeated as represented by query block 1154, or the procedure terminated, as represented by block 1156, whereupon use of the expert system is ended at END block 1158.

Although certain presently preferred embodiments of the invention have been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

What is claimed is:

1. An expert system for identifying and selecting from a group of medium-voltage cable construction specifications a desired medium-voltage cable construction specification meeting a set of medium-voltage cable requirement specifications and producing a price quotation therefor, comprising:

a data storage unit including stored data in at least one database;

a knowledgebase including rules for selecting and pricing cables according to respective cable construction specifications;

a computer;

a program instruction set;

means for entering data in response to inquiries from the program instruction set and the knowledgebase;

means for calculating a price quotation for a selected, desired medium-voltage cable of specified length; and means for outputting the price quotation in human cognizable form; wherein the program instruction set is adapted for rule-based selection of the desired medium-voltage cable, for determination of the costs of manufacture of the selected medium-voltage cable, and for output of the price quotations, wherein the stored data includes medium-voltage cable construction specifications, raw and intermediate materials information and prices from which the desired medium-voltage cable is constructed, and availability and production data for various medium-voltage cable construction specifications.

2. The expert system of claim 1, wherein the computer includes a memory unit, a control unit, an arithmetic logic unit, and an input/output unit.

3. The expert system of claim 1, further including means for exchanging data between the computer and the data storage unit.

4. The expert system of claim 3, wherein the knowledgebase stores a plurality of rules regarding medium-voltage cable selection and component selection, the database stores a plurality of medium-voltage cable construction specifications and materials information, the knowledgebase and the database are stored in a storage unit, and the means for exchanging data includes means for controlling access to the database and to the knowledgebase.

5. The expert system of claim 1, further including means for entering data into the computer.

6. The expert system of claim 5, wherein the means for entering data includes a keyboard responsive to inquiries produced by the knowledgebase and the program instruction set.

7. The expert system of claim 5, wherein the means for entering data includes a mouse means for choosing among a group of menu choices responsive to inquiries produced by the knowledgebase and the program instruction set.

8. A method of selecting a medium-voltage cable construction specification meeting a set of medium-voltage cable requirement specifications and producing a price quotation therefor in an expert system including a data storage unit having stored data in at least one database; a knowledgebase including rules for selecting and pricing medium-voltage cables; a computer; a program instruction set; means for entering cable requirement specification data in response to inquiries from the program instruction set and the knowledgebase; and means for output of the quotation in human cognizable form, comprising the steps of:

a) entering a first series of responses to a plurality of data queries, including medium-voltage cable requirement specification responses;

b) selecting from the database a medium-voltage cable construction specification by rule-based interrogation of the knowledgebase;

c) determining the selected medium-voltage cable size;

d) determining the selected medium-voltage cable materials and manufacturing cost per unit length; and e) generating for output a price quotation for the selected medium-voltage cable by computer reference to the responses, the stored database data, and the knowledgebase after selection of a particular construction specification for the cable.

9. The method of claim 8, wherein step b) includes entering the presence or absence of a moisture block material, wherein the selected medium-voltage cable construction specification includes at least one conductor, and wherein step d) includes entering the conductor material.

10. The method of claim 9, wherein step b) further includes the step of determining if the selected medium-voltage cable construction specification includes a strand shield by reference to the presence or absence therein of a moisture block material, and wherein step d) further includes the step of adjusting the price quotation by the added cost of materials for the moisture block material.

11. The method of claim 8, wherein step b) further includes the step of identifying an insulation material type and insulation thickness, and an insulation shield and shield size for the medium-voltage cable, and wherein step d) further includes the step of adjusting the price quotation by the added cost of materials for the insulation and shield.

12. The method of claim 8, wherein the selected medium-voltage cable construction specification includes a tape seal, further including the steps of determining the materials of the tape seal and the presence of a longitudinal corrugated shield, and wherein step d) further includes the step of adjusting the price quotation by the added cost of tape seal and longitudinal corrugated shield materials.

13. The method of claim 8, wherein the selected medium-voltage cable construction specification includes a covering of neutral wires, further including the steps of determining the type, number, and size of the neutral wires, and wherein step d) further includes the step of adjusting the price quotation by the added cost of the neutral wires materials.

14. The method of claim 8, wherein step c) includes determining the length, weight, and outside diameter of the selected medium-voltage cable construction specification.

15. The method of claim 14, wherein step a) includes the step of determining shipment packaging, including one or more cable reels, and step d) further includes the step of adjusting the price quotation by the added cost of the shipment packaging materials.

16. An expert system for identifying and selecting from a group of medium-voltage cable construction specifications a desired medium-voltage cable construction specification meeting a set of medium-voltage cable requirement specifications needs and producing a price quotation therefor, comprising:

a data storage unit including stored data in at least one database;

a knowledgebase including rules for selecting and pricing cables according to respective cable construction specifications based on a plurality of material layers extending radially from the center of the cable;

a computer;

a program instruction set;

means for entering data in response to inquiries from the program instruction set and the knowledgebase;

means for calculating a price quotation for a selected, desired medium-voltage unitary cable of specified length; and means for outputting the price quotation in human cognizable form; wherein the program instruction set is adapted for rule-based selection of the desired medium-voltage cable, for determination of the costs of manufacture of the selected medium-voltage cable, and for output of the price quotation, wherein the stored data includes medium-voltage cable construction specifications, raw and intermediate materials information and prices from which the desired medium-voltage cable is constructed, and availability and production data for various medium-voltage cable construction specifications, and wherein the medium-voltage cables have only first and second ends.

* * * * *